United States Patent [19]

Knox et al.

[11] 4,086,195

[45] Apr. 25, 1978

[54] BITUMEN FILLED POLYESTER FOAMS

[75] Inventors: Walter R. Knox, Town & Country; James C. Hill, Chesterfield; Lawrence J. Hughes, St. Charles; Paul W. Foerst, Florissant, all of Mo.

[73] Assignee: Monsanto Company, St. Louis, Mo.

[21] Appl. No.: 773,720

[22] Filed: Mar. 2, 1977

[51] Int. Cl.$^2$ .............................................. C08J 9/02
[52] U.S. Cl. ........................ 260/2.5 N; 260/2.5 EP; 260/2.5 D; 260/28 P; 260/47 EQ; 260/78.41
[58] Field of Search ................... 260/2.5 D, 2.5 F, 28, 260/2.5 EP, 18 EP

[56] References Cited

U.S. PATENT DOCUMENTS 2,956,034  10/1960  Simpson .......................... 260/18 EP
3,284,390  11/1966  Scheibli et al. .................. 260/18 EP

*Primary Examiner*—Morton Foelak
*Attorney, Agent, or Firm*—J. C. Logomasini; P. L. Passley; S. M. Tarter

[57] ABSTRACT

Bitumen filled polyester foams are provided through a process which comprises forming a solution of a bitumen having a softening point of at least about 80° C. and a cyclic diacid anhydride at a temperature above the softening point of a bitumen, the bitumen solution is then mixed with a monoterminal epoxide and a polyterminal epoxide in the presence of a blowing agent resulting in the initiation of an exothermic reaction. The process for producing bitumen filled polyester foams through the in situ polymerization of polyesters in a solution of bitumen and the foams produced by the process constitute the invention.

17 Claims, No Drawings

BITUMEN FILLED POLYESTER FOAMS

BACKGROUND OF THE INVENTION

The invention relates to polymer foams and particularly to foams made from in situ polymerized polyesters in the presence of bitumen.

In another aspect, the invention relates to a process for the production of foamed polymeric materials comprising the in situ polymerization of polyesters in a solution of bitumen.

The formation of blends of certain polymers with a bitumen component has been proposed for the purpose of producing a water resistant coating material. For example, a blend of a liquid bitumen with a polyurethane prepolymer and a cross-linking agent is proposed in U.S. Pat. No. 3,179,610. Such compositions are said to be excellent for sealing surfaces, for filling cracks and as a binder for aggregates. In U.S. Pat. No. 3,385,802 a composition comprising an unsaturated polyester, coal and a polymerizable liquid vinyl monomer is cross-linked to form a protective coating. This material can also be foamed to provide an insulating layer.

Other blends of polymer and bituminous material which can be foamed are proposed in U.S. Pat. Nos. 3,177,164 (ethyl/vinyl acetate copolymer with asphalt), and 3,784,487 (novalak/bitumen). In U.S. Pat. No. 3,491,047 a bitumen is reacted with maleic anhydride which is then reacted with a polymer containing hydroxyalkylene, ester-substituted alkylene and alkylene monomer units. The products are said to have high strength and elasticity.

However, the prior art has not proposed any process for the production of a cross-linked polyester foam containing bitumen that is adapted to give a product that can be produced from the monomeric ingredients in a single operation, which is therefore adapted to production of articles by a "foam in place" single-step operation.

The present invention provides a polyester/bitumen product that can be formed in a single operation from the monomeric components and which has low heat conductivity and low water permeability. The polymeric product can be made more flexible or rigid by a simple variation of the relative proportions of the components. Moreover, the reaction by which the product is formed is so rapid that it is well adapted for use in the production of foam-in-mold articles. The reaction has the further advantage that the ingredients are mixed in the form of a liquid or a slurry so that extrusion or high pressure equipment is not required.

The polyester of use in the process of the present invention is fully described in commonly assigned, copending Application Ser. No. 646,215 which is hereby incorporated by reference.

DESCRIPTION OF THE INVENTION

The present invention provides a process for the production of a foamed polymeric material which comprises forming a solution of a bitumen having a softening point of at least about 80° C. and a cyclic diacid anhydride at a temperature above the softening point of the bitumen and initiating an exothermic reaction by mixing the solution with a monoterminal epoxide and a poly-terminal epoxide in the presence of a blowing agent; the ratio of total epoxy groups to cyclic diacid anhydride groups being from 1:1 to 2:1 and the epoxy-equivalent mole ratio of polyepoxide to monoepoxide being from 0.01 to 1.0; the temperature of the bitumen solution upon mixing being such that the blowing agent is activated and a foam is generated and such that the viscosity of the mixture is not so low that the gas generating the foam is able to escape from the mixture before the foam has solidified to such an extent that no foaming occurs; the amount of bitumen used being from about 70% to about 95% by weight of the total weight of the foamed polymeric material and allowing the reaction to proceed, without cooling, until the exothermic reaction has ceased.

When the anhydride/bitumen solution is added to the monoepoxide/polyepoxide mixture a highly exothermic reaction is initiated which results in the production of a cross-linked polyester material with the degree of cross-linking determined by the amount of polyepoxide present in the mixture. The proportion of bitumen in the foamed polymeric material can be from 70% to 95% of the total weight. Foams having this composition show greater heat stability and better compressive strength than foams made from bitumen alone. In addition, it is possible to attain a lower density foam and one which is less friable and more resistant to abrasion. The foams of the invention are suitable for heat insulation purposes and for producing buoyant materials. They can also be used to produce impact barrier materials and, especially where higher densities are employed, "structural foams".

Foams made according to the process of the invention are very versatile and comparatively cheap. They can be adapted for a wide range of uses and can incorporate additives such as flame retardants and fillers that render them particularly suitable for a number of specialized end-uses.

Bitumen is defined for the purpose of this invention as a mixture of hydrocarbons of natural or pyrogenous origin or a combination of both, frequently accompanied by their non-metallic derivatives, which are solid at ambient temperatures and which are, apart from any trace quantities of any metallic component therein completely soluble in carbon disulfide. Suitable bitumen materials include natural bitumens or natural asphalts including all of those asphaltic materials which are found in naturally occurring deposits. Preferred bitumens are the asphalt types including gilsonite, gramite, glants pitch and the like. Oil or petroleum asphalts derived from vacuum and/or steam distillation of crude oils and the blown or oxidized asphalt which may be formed from semi-asphaltic materials by air blowing soft or liquid petroleum residues and cracked asphalts may also be used.

The bitumens have a softening point of at least about 80° C. and it is to be understood that all references to softening points in this specification refer to the parameter determined using the "Ring and Ball" test described in ASTM-D36-26. While the bitumens have a softening point of at least about 80° C. it is to be noted that the higher the softening point the more brittle is the foam that is eventually produced by the process of the invention. In practice, therefore, the preferred bitumens have a softening point of from 80° C. to 150° C. A particularly preferred bitumen is gilsonite which has a softening point of 100° C. to 140° C.

The polyester, as was indicated above, is described in co-pending patent application Ser. No. 646,215, and the process of the present invention is closely related to that in the above application with the difference that a substantial proportion of bitumen is present. The reaction between the components of the polyester according to Ser. No. 646,215 is highly exothermic. In order for the desired polyester to be produced it is important that the mixture of reactants be raised to a temperature at which the exothermic reaction becomes self-sustaining and controlling the reaction conditions during such self-sustaining exothermic reaction. Mixing of the bitumen/anhydride solution with the epoxide components at a temperature at which the bitumen is molten ensures that the exothermic reaction is initiated directly so that the polyester is formed immediately. It is found that while in the absence of bitumen the reaction can take as much as 600 seconds to run to completion, in the present invention foaming is complete and the mixture has begun to cool after from one to three minutes. It is an unexpected feature of the present invention that, whereas in the absence of the gilsonite, a catalyst is required to produce the polyester in good yield and quality, in the presence of a gilsonite no catalyst is required and the reaction proceeds speedily to conclusion yielding a good product.

The poly-terminal epoxide used in the invention is one having a plurality of

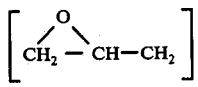

groups and may be obtained by reacting epichlorohydrin with a compound having a plurality of active hydrogen atoms.

Preferred epoxides are those having the formula:

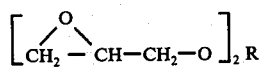

where R is a hydrocarbyl radical comprising at least two aromatic nuclei.

Typical poly-terminal epoxides may be obtained by reacting epichlorohydrin with for example a bisphenol such as bisphenol A, a polyamine such as diethylene tetramine, or a polyamide resin. Of these, those that can be formed by reacting epichlorohydrin with a hydroxyl-group containing compound are preferred. Apart from the bisphenol reaction product mentioned above, other compounds that can be reacted with epichlorohydrin to form useful poly-terminal epoxides include aliphatic diols and triols and novolac resins.

Bisphenol A, is a particularly useful compound from which, a poly-terminal epoxide can be derived by reaction of the bisphenol A with epichlorohydrin. This is a well-known compound and is readily available commercially from a number of sources. Polymerized with a small amount of a cross linking agent such as an anhydride or a polyamine, it forms conventional epoxy-resins.

The mono-epoxide is a compound containing the ring structure,

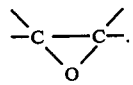

The simplest member of the epoxide family is ethylene oxide, wherein the pendant valencies are occupied by hydrogen atoms. By substituting various radicals for the hydrogen atoms, a large number of alternative epoxides can be derived. Since the epoxide of use in the invention is preferably a terminal epoxide, the pendant valencies on one of the carbons should be occupied by hydrogen. Typical epoxides include propylene oxide, butylene oxide, 1,2-hexylene oxide, styrene oxide and iodo-styrene oxides and alphamethyl-styrene oxide. In general, since the preferred process for producing such polyesters is operated at about atmospheric pressure and since low boiling epoxides would require operation at superatmospheric pressures, the preferred epoxides are those with a boiling point in or above the range of temperatures at which the polymer is made. In general, monoepoxides containing an aromatic radical meet this requirement.

The epoxy equivalent mole ratio of diepoxide to monoepoxide used to produce the polyesters of the invention lies between 0.01 and 1.00 but the preferred ratio depends on the end use of the product.

The term "epoxy-equivalent mole ratio" is defined as the ratio of (the grams of the polyepoxide divided by polyepoxide equivalent weight) to (the grams of monoepoxide divided by the monoepoxide equivalent weight). The epoxy equivalent weight of the diterminal epoxide of bisphenol A for example is 188, i.e., the molecular weight divided by two and for styrene oxide it is 120, (i.e., molecular weight divided by 1).

The third reactant is an anhydride of a dicarboxylic acid comprising an anhydride group having the formula:

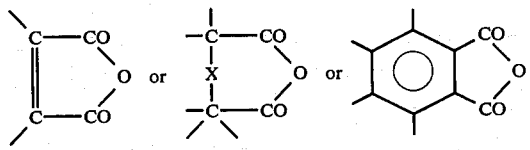

where —X— is a single bond or a saturated or unsaturated $C_1$–$C_6$ hydrocarbyl group.

Typical anhydrides include maleic anhydride, succinic anhydride, glutaric anhydride, adipic anhydride, and phthalic anhydride. For most purposes there is little advantage in providing an unsaturation in the anhydride molecule and the preferred anhydride is phthalic anhydride. If, however, it is intended to form a foam, it can be useful to provide that part at least of the anhydride is maleic anhydride since under the reaction conditions, it is found that maleic anhydride decomposes in part to yield carbon dioxide, thus providing an in-built blowing agent for the system.

It is possible to employ a mixture of anhydrides in the reaction and in some circumstances this is desirable. However, if the anhydride decomposes at elevated temperatures as is the case with maleic anhydride, for example, problems arise if the anhydride is totally incorporated in the bitumen. This problem is exacerbated if the bitumen contains metallic residues as does gilsonite since these apparently accelerate the decomposition of the anhydride.

While it is in theory possible to incorporate all the anhydride in the epoxide mixture if the mixture is maintained at a temperature below that at which the polyester-forming reaction is initiated, (usually below about 70° C. and preferably below 50° C.), this leads to difficulties in obtaining a truly homogeneous mixture when the polyester-forming components are mixed with the bitumen. For this reason the major part of the anhydride component that will form the polyester must be mixed with the bitumen before the polyester-forming reaction takes place. In practice, a decomposable anhydride such as maleic anhydride cannot provide the whole of the anhydride component and must be present in the epoxide mixture (primarily as a blowing agent) while the other (non-decomposable) anhydride is mixed with the bitumen in the proportions above specified.

The mixing of the components takes place at a temperature at which a exothermic reaction is spontaneously initiated. In such circumstances local hot-spots are easily generated and it is important that the components of the mixture are efficiently mixed.

The reaction that occurs between the anhydride and the epoxides is identical to the one described in co-pending Application Ser. No. 646,215 save for the absence of the catalyst. However, the presence of a major proportion of bitumen modifies the reaction in that the bitumen acts as a sink for the reaction heat generated and the highest temperature reached is usually found to be substantially lower than when the corresponding reaction is carried out in the absence of bitumen.

It is most important that at least part of the anhydride be added along with the bitumen since it is found that if the bitumen is added separately to the polyester components, the product is often not foamed and if foamed, some evidence of phase separation is found. Indeed, in extreme cases the foamed material sits on top of a layer of separated bitumen.

The foaming of the polymeric material is accomplished by the use of a blowing agent. The blowing agent may be a chemical blowing agent, that is to say one that generates a gas when heated above its decomposition temperature, or it may be a physical blowing agent, that is to say one which generates the gas as a result of a phase change. It is, however, often advantageous to provide that the foaming be the result of the decomposition of maleic anhydride which is incorporated as one of the components forming the polyester. It is found that maleic anhydride is particularly liable to decompose where the bitumen used is gilsonite. While the mechanism for this reaction is not fully understood, it is believed that the decomposition is promoted by the presence of metallic residues in the gilsonite since petroleum asphalt which does not have such metallic residues does not have anything like the same effectiveness in bringing about the decomposition of maleic anhydride. Clearly, when maleic anhydride is one of the components of the polyester, the proportion used in the reaction should be adjusted to take into account the amount that will be used up in the role of blowing agent, and the maleic anhydride component should be kept separate from the asphalt (where said asphalt is gilsonite) until the mixing of the components takes place.

Alternatively, or perhaps additionally, a blowing agent such as azodicarbonamide, azoisobutyronitrile, oxybis benzenesulfonyl hydrazide) and the like may be used. Physical blowing agents which may be used include water, carbon dioxide, trichlorofluoromethane and the like. Conventional blowing agents such as aliphatic hydrocarbons are not generally suitable since they are often soluble in the bitumen.

The foam generated by the process of the invention can have a density varying from 0.01 to 0.8 gm/cm³. Obviously within this range the actual density obtained will be dependent on the relative proportions of the bitumen and the polyester and the nature of the bitumen selected. In general, however, the most satisfactory foams produced according to the process of the invention have a density of from 0.05 to 0.5 gm/cm³.

The compressive strength of the foams produced according to the process of the invention can vary from 0.1 to 80 kg/cm² though the actual strength will depend on the same parameters that determine the density of the foam.

It is often important that the foams be rendered flame retardant and conventional additives such as tri-cresyl phosphate, hexabromododecatriene, tris-(2-chloroethyl) phosphate, antimony oxide, and the like are suitable for such uses.

Since the compositions contain a relatively high proportion of bitumen the dominant color is black. However, it is possible, by blending the composition with as much as 20%–30% of finely divided aluminum, to give the composition a silvery appearance. Such addition also increases the density and to some extent the compressive strength of the foam.

Other additives that can be present in the composition include foam stabilizers such as aluminum stearate, caluim oleate and magnesium laurate may be present. Commercially available foam accelerators may also be present.

Effective polyester catalyst are optional process additives when the bitumen is asphalt, for example quaternary salt catalyst are suitable wherein the terms "quaternary salt" is intended to cover quaternary ammonium and quaternary phosphonium salts as well as mixtures of compounds which form a quaternary salt in situ, such as a mixture of tertiary amine and a $C_1$-$C_{10}$ alkyl or aralkyl halide.

By the term "catalytically effective quaternary salt" is to be understood a quaternary salt that, when mixed with styrene oxide and phthalic anhydride in an oxide to anhydride to salt molar ratio of 1.3:1.0:0.17 and heated at 180° C. and atmospheric pressure initiates an exothermic reaction in less than 160 seconds (including time to heat the mixture from ambient temperature to 180° C.) which reaches a peak temperature of from 229° to 237° C. in a period from 18 to 45 seconds after initiation to yield a linear polyester having a polymer melt temperature of at least 50° C. and an acid number not greater than 65.

SPECIFIC EMBODIMENTS

The invention is further illustrated in the following examples in which the mode of preparation is set forth. The properties of the products made by the process of the invention are also described and comparative examples in which a different order of additions of the reactants was tried are given.

EXAMPLE 1

A mixture of 5.4g of phthalic anhydride and 60g of a gilsonite available under the trade designation "Zeco II" was prepared and heated to 160°–170° C. to effect complete solution. To this mixture were added 0.8g of aluminum stearate and a flame retardant composition of the type and in the amount below specified.

At the same time a mixture of 9.4g of maleic anhydride, 8.1g of styrene oxide and 11.5g of a polyepoxide which was the diglycidyl ether of bisphenol A was prepared and maintained at a temperature below that at which the anhydride and epoxides began to react to any substantial degree.

It should be noted that the maleic anhydride was added separately from the phthalic anhydride because, as was indicated above, the gilsonite has the effect of promoting the decomposition of the maleic anhydride at elevated temperatures and while this is desirable once the resin components are reacting it is undesirable before that time.

The solutions were then mixed with continuous effective stirring and almost at once a rapid exothermic reaction was observed and a foam began to form.

It was found that, providing the mixing had been efficient, the foam was uniform with excellent resilience and compressive strength.

It was further noted that the flame-retardant composition which comprised either tricresyl phosphate or a blend of a flame retardant and an agent to improve the compatibility of the flame retardant with the bitumen/polyester blend had an effect on the compressive strength of the final product.

Two samples were then cut from each of the foams and were tested for density, percentage of void space, percentage of open-cells and compressive strength.

The results of the above are given in Table 1 following:

TABLE 1

| Foam Sample | Flame Retardant Type*-Grams | | Density | % Open Celled | % Voids | Compressive Strength kg/cm² |
|---|---|---|---|---|---|---|
| 1 | TCP | 24 | 0.085 | 93.76 | 91.48 | 0.30 |
|   |     |    | 0.089 | 93.45 | 91.13 | 0.31 |
| 2 | S-148 | 12 | 0.070 | 94.88 | 93.04 | 0.10 |
|   | P-2XC20 | 12 | 0.075 | 93.96 | 92.51 | 0.24 |
| 3 | S-141 | 2.4 | 0.067 | 94.93 | 93.28 | 0.16 |
|   | P-2XC20 | 21.6 | 0.066 | 94.27 | 93.38 | 0.24 |
| 4 | S-141 | 12 | 0.075 | 93.61 | 92.45 | 0.22 |

TABLE 1-continued

| Foam Sample | Flame Retardant Type*-Grams | | Density | % Open Celled | % Voids | Compressive Strength kg/cm² |
|---|---|---|---|---|---|---|
|   | P-2XC20 | 12 | 0.072 | 93.42 | 92.77 | 0.24 |
| 5 | S-141 | 12 | 0.073 | 94.37 | 92.66 | 0.20 |
|   | P-503 | 12 | 0.072 | 94.79 | 92.77 | 0.27 |
| 6 | S-141 | 12 | 0.066 | 95.13 | 93.42 | 0.13 |
|   | P-1227 | 12 | 0.064 | 95.82 | 93.62 | 0.17 |
| 7 | S-148 | 12 | 0.062 | 95.46 | 93.77 | 0.08 |
|   | P-1227 | 12 | 0.059 | 95.11 | 94.11 | 0.10 |

*T.C.P. Tricresyl Phosphate
S-141, S-148) Long-chain phosphate ester available commercially from Monsanto® Company as Santicizer® -141 and -148 respectively.
P-2XC20, P-1227) Chloronated phospate esters available from Monsanto® Company as Phosgard® 2XC20 and 1227 respectively.
P-503 A polymeric phosphite - phosphonate available from Monsanto® Company as Phosgard® 503.

EXAMPLE 2

A solution of 0.3g azobisformamide, 2.5g of phthalic anhydride, 1.9g Epon 828, 1.3g styrene oxide and 0.2g tetramethyl ammonium bromide was prepared and mixed in a 25 mm test tube with 6.0g of asphalt (270° F. s.p.) at 165° C. An exothermic reaction occurred resulting in a maximum temperature of 188° C. and foaming took place. The foamed polymeric material when cooled occupied a length of 3 inches in the 25 mm test tube compared to 1.75 inches in a non-foamed sample.

EXAMPLE 3

According to the invention, the results of Tables 2 and 3 were achieved by mixing phthalic anhydride with bitumen and heating the mixture to 150° to 160° C. Styrene oxide, Epon 828 and maleic anhydride were mixed and heated to 100° to 120° C. and then, admixed with the heated bitumen mixture or solution.

TABLE 2

S = styrene oxide; E = Epon 828; M = maleic anhydride; P = phthalic anhydride
S+E+M = 24.0g + 34.0g + 27.8g M
Bitumen = 10.5 gilsonite + 10.5g asphalt
Charge = 9g(S+E+M+P) + 21g Bitumen

| Run No. | S+E+M Grams | Mole Ratios | | | Surfactant | | Temp. °C. | Time On Heat (sec.) | P Grams |
|---|---|---|---|---|---|---|---|---|---|
|   |   | S/E | M/P | P/SE | Identity | Grams |   |   |   |
| 1 | 8.4 | 2/1 | 7/1 | 1.08 | — | — | 155 | 120 | 0.6 |
| 2* | 8.4 | 2/1 | 7/1 | 1.08 | Al Stearate | 0.2 | 160 | 100 | 0.6 |
| 3 | 6.9 | 2/1 | 1.55/1 | 1.56 | — | — | 160 | 100 | 2.1 |
| 4* | 6.9 | 2/1 | 1.55/1 | 1.56 | Al Stearate | 0.2 | 160 | 100 | 2.1 |
| 5 | 7.0 | 2/1 | 1.7/1 | 1.51 | — | — | 160 | 90 | 2.0 |
| 6* | 7.0 | 2/1 | 1.7/1 | 1.51 | Al Stearate | 0.2 | 160 | 90 | 2.0 |
| 7 | 7.2 | 2/1 | 2/1 | 1.42 | — | — | 160 | 90 | 1.8 |
| 8* | 7.2 | 2/1 | 2/1 | 1.42 | Al Stearate | 0.2 | 160 | 80 | 1.8 |
| 9 | 7.9 | 2/1 | 4/1 | 1.18 | — | — | 160 | 90 | 1.1 |
| 10* | 7.9 | 2/1 | 4/1 | 1.18 | Al Stearate | 0.2 | 160 | 90 | 1.1 |
| 11 | 8.3 | 2/1 | 6/1 | 1.11 | — | — | 160 | 70 | 0.7 |
| 12 | 8.3 | 2/1 | 6/1 | 1.11 | Al Stearate | 0.2 | 160 | 70 | 0.7 |

*Surface shows fewer large crater bubbles.

TABLE 3

| Run No. | Dimensions L×W×H(in.) | Volume | | Weight Grams | Air Picnometer cc | Density 9/cc | Cell | |
|---|---|---|---|---|---|---|---|---|
|   |   | in³ | cc |   |   |   | % Total | % Open |
| 1A | 1.023×1.010×0.997 | 1.033 | 16.93 | 3.4158 | 3.0 | 0.2018 | 80.3 | 82.3 |
| 1B | 1.035×0.886×0.946 | 0.867 | 11.97 | 2.5069 | 1.8 | 0.2112 | 79.3 | 84.8 |
| 2A | 1.097×1.098×1.042 | 1.255 | 20.57 | 4.1707 | 3.33 | 0.2028 | 80.2 | 83.3 |
| 2B | 1.045×1.080×1.050 | 1.185 | 19.42 | 4.1959 | 3.35 | 0.2161 | 78.9 | 82.7 |
| 3A | 1.110×1.035×0.950 | 1.091 | 17.88 | 3.9609 | 3.7 | 0.2215 | 78.4 | 79.3 |
| 3B | 1.074×1.109×1.062 | 1.265 | 20.73 | 4.0194 | 3.10 | 0.1939 | 81.08 | 85.0 |
| 4A | 1.177×0.929×1.039 | 1.136 | 18.62 | 3.7079 | 2.65 | 0.1991 | 88.6 | 85.8 |
| 4B | 1.061×1.171×1.054 | 1.309 | 21.45 | 4.2600 | 3.15 | 0.1986 | 80.6 | 85.3 |
| 5A | 1.096×1.237×1.179 | 1.598 | 26.19 | 5.1000 | 4.30 | 0.1947 | 81.0 | 83.6 |
| 5B | 1.053×1.230×1.135 | 1.470 | 24.09 | 5.0594 | 4.90 | 0.2100 | 79.5 | 79.7 |
| 6A | 1.108×0.980×1.150 | 1.249 | 20.47 | 4.0886 | 4.30 | 0.1997 | 80.6 | 79.0 |
| 6B | 1.158×1.163×1.140 | 1.535 | 25.16 | 4.9636 | 3.45 | 0.1973 | 80.8 | 86.3 |
| 7A | 1.249×0.977×0.998 | 1.218 | 19.96 | 4.7582 | 3.95 | 0.2384 | 76.7 | 80.2 |
| 7B | 1.253×1.057×1.040 | 1.377 | 22.57 | 4.4553 | 3.55 | 0.1974 | 80.7 | 84.3 |
| 8A | 1.251×0.949×1.201 | 1.426 | 23.37 | 4.1402 | 3.30 | 0.1772 | 80.0 | 85.9 |
| 8B | 1.284×1.024×1.250 | 1.598 | 26.19 | 5.0207 | 4.75 | 0.1917 | 81.3 | 81.9 |

TABLE 3-continued

| Run No. | Dimensions L×W×H(in.) | Volume in³ | cc | Weight Grams | Air Picnometer cc | Density 9/cc | Cell % Total | % Open |
|---|---|---|---|---|---|---|---|---|
| 9A | 1.161×1.058×1.184 | 1.454 | 23.83 | 4.6479 | 1.65 | 0.1950 | 81.0 | 93.1 |
| 9B | 1.168×1.063×1.193 | 1.481 | 24.27 | 4.7604 | 3.80 | 0.1961 | 80.9 | 84.3 |
| 10A | 1.107×1.191×1.178 | 1.553 | 25.45 | 4.7006 | 0.7* | 0.1847 | 82.0 | 97.4 |
| 10B | 1.160×1.181×1.173 | 1.607 | 26.34 | 4.5708 | 2.10 | 0.1735 | 83.1 | 92.0 |
| 11A | 1.143×1.105×1.098 | 1.386 | 22.72 | 3.6940 | 2.60 | 0.1626 | 84.1 | 88.6 |
| 11B | 1.112×0.938×0.960 | 1.001 | 16.41 | 3.7436 | 2.90 | 0.2281 | 77.7 | 82.3 |
| 12A | 1.113×1.110×1.211 | 1.496 | 24.52 | 5.0428 | 4.10 | 0.2057 | 79.9 | 83.3 |
| 12B | 1.130×1.160×1.187 | 1.560 | 25.57 | 4.9663 | 4.05 | 0.1942 | 81.1 | 84.2 |

*Breaking

EXAMPLE 4

A solution of 0.75g maleic anhydride, 0.38g phthalic anhydride, 0.75g styrene oxide, and 1.15g Epon 828 was prepared and heated. The heated solution was added to 7 grams of gilsonite (Zeco II) at 150° to 180° C. The system produced very little foam and left a very hard, dense mass product.

Example 4 is not in accordance with the invention and is presented for comparative purposes; however, the materials produced by the process of Example 4 provide a coating or sealant material for asphalt or concrete structures such as highways, driveways and bridges. These non-foam materials have good wear properties and could also be utilized for pipeline, storage tanks and roofing coatings.

What is claimed is:

1. A process for the production of foamed polymeric material which comprises forming a solution of a bitumen having a softening point of at least about 80° C. in a cyclic diacid anhydride at a temperature above the softening point of the bitumen and initiating an exothermic reaction by mixing the solution with a monoterminal epoxide and a poly-terminal epoxide in the presence of a blowing agent; the ratio of total epoxy groups to cyclic diacid anhydride groups being from 1:1 to 2:1 and the epoxy-equivalent mole ratio of polyepoxide to monoepoxide being from 0.01 to 1.0; the temperature of the bitumen solution upon mixing being such that the blowing agent is activated and a foam is generated and such that the viscosity of the mixture is not so low that the gas generating the foam is able to escape from the mixture before the foam has solidified to such an extent that no foaming occurs; the amount of bitumen used being from about 70% to about 95% by weight of the total weight of the foamed polymeric material; and allowing the reaction to proceed, without cooling, until the exothermic reaction has ceased.

2. A process according to claim 1 in which the softening point of the bitumen is from about 80° to about 150° C.

3. A process according to claim 1 in which the solution of the bitumen in the anhydride is mixed with the epoxides at a temperature of from about 130° to about 180° C.

4. A process according to claim 1 in which the bitumen is gilsonite.

5. A process according to claim 1 in which the cyclic diacid anhydride is a mixture of phthalic anhydride and maleic anhydride in a proportion of from 1 to 10 parts of maleic to one part of phthalic.

6. A process according to claim 1 in which the polyepoxide is the reaction product of bisphenol A with two moles of epichlorohydrin.

7. A process according to claim 1 in which the monoepoxide is styrene oxide.

8. A process according to claim 1 in which the blowing agent is provided at least in part by maleic anhydride.

9. A process according to claim 1 in which a flame retardant is incorporated in the composition.

10. A process according to claim 9 in which the flame retardant is tricresyl phosphate.

11. A process according to claim 1 in which the bitumen is asphalt.

12. A process according to claim 11 in which the solution of the asphalt in the anhydride includes a catalytically effective quaternary salt.

13. The polymer foams produced by the process according to claim 1.

14. The polymer foams produced by the process according to claim 4.

15. The polymer foams produced by the process according to claim 11.

16. The polymer foams produced by the process according to claim 12.

17. A process for the production of a foamed polymeric material which comprises forming a solution of gilsonite in phthalic anhydride at a temperature of from about 130° to about 180° C. and initiating an exothermic reaction by mixing the solution with styrene oxide and the reaction product of one mole of bisphenol A with two moles of epichlorohydrin; in the presence of a blowing agent the ratio of total epoxy groups to anhydride groups being from 1:1 to 2:1 and the epoxy-equivalent mole ratio of polyepoxide to monoepoxide being from 0.01 to 1.0: the amount of gilsonite used being from about 70% to about 95% by weight of the foamed polymeric material; and allowing the reaction to proceed without cooling until the exothermic reaction has ceased.

* * * * *